Jan. 23, 1951          F. R. HIGLEY          2,538,782

FRUIT JUICE EXTRACTOR MOUNTED FOR CYCLOIDAL MOVEMENT

Filed Aug. 30, 1948

INVENTOR,

Frank R Higley

Patented Jan. 23, 1951

2,538,782

UNITED STATES PATENT OFFICE 2,538,782

FRUIT JUICE EXTRACTOR MOUNTED FOR CYCLOIDAL MOVEMENT

Frank R. Higley, Cleveland Heights, Ohio

Application August 30, 1948, Serial No. 46,799

13 Claims. (Cl. 146—3)

This invention relates to citrus fruit juice extractors of the type employing a reamer mounted for cycloidal movement, to which reamer a half of the fruit is impaled for the extracting operation, which operation is effected by cranking motion of the operator's hand by which the fruit half is held on the reamer.

Such type of extractor is disclosed in my copending application Serial No. 716,690, filed December 17, 1946, and the objects of this invention are to improve thereon.

More particularly, the invention contemplates as an object a tilting motion of the reamer head, accompanying its cycloidal motion, of sufficient angularity that application of radially outward forces, by the fruit to the reamer, is not required of the operator, so that operation is easier than heretofore.

Another object of the invention is to provide a unit comprising principally reamer and base therefor, which unit may be applied to the mouth of a container which is to receive the extracted juice, together with improved means for grasping, as by the operator's left hand, the unit employing the container as a base while the operator's other hand manipulates the fruit in the reaming operation; novel means being employed for the purpose, as will appear.

Other objects are to provide such a device of few parts easily washable and simply and cheaply producible as of plastic material by molding process.

Figure 1:
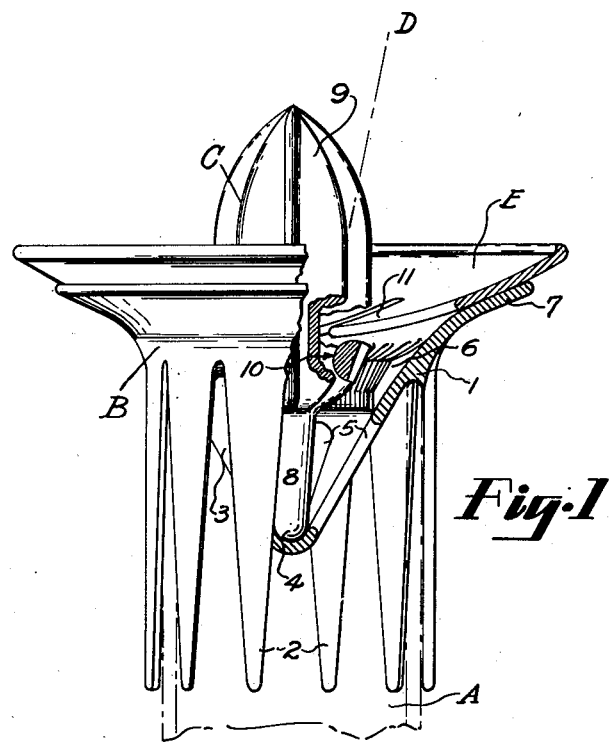
Figure 2:
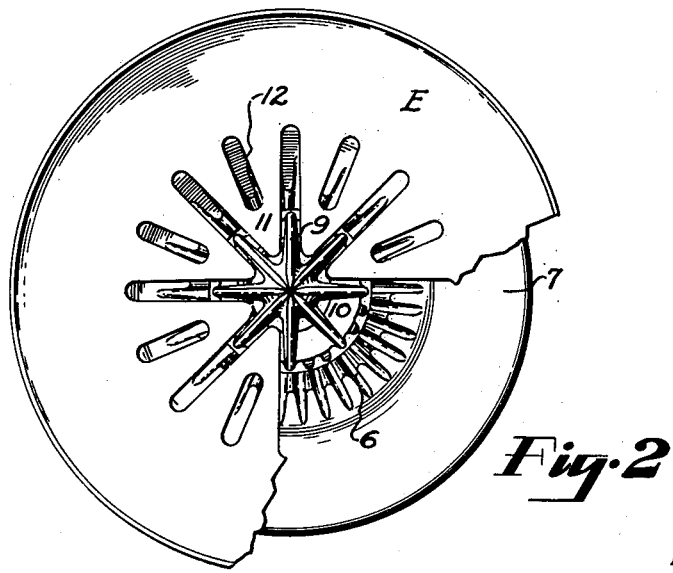

Further objects and advantages will be apparent from the following description taken in connection with the accompanying drawing, wherein:

Fig. 1 is a view in elevation of an embodiment of the device indicating in broken lines a container mouth portion on which the device may be mounted, and also indicating the tilt of the reamer in operation, and Fig. 2 is a plan view of the same, in both views the parts being shown in concentric relation, and portions thereof being broken away to show details of construction.

With reference now to the drawings, A indicates in broken lines the cylindrical mouth portion of a container or other receptacle, such as a tumbler, for extracted juices, on which the extractor is to be mounted as a unit for the extracting operation during which the container A serves as a base for the device.

Principal parts of the device are a base means generally indicated at B and reamer means generally indicated at C.

More particularly, the base means B includes an annularly recessed portion 1 removably seatable on the rim of the mouth of the container A. Holding means are provided dependent from the portion 1 outside the container for receiving the grasp of an operator's hand to secure the base B and thereby the container A against movement during the reaming operation.

As here shown, such means comprises a plurality of tapering fingers 2 downwardly extending sufficiently to receive the palm of the hand, with spaces therebetween providing visibility for the container, so that if the latter be transparent its contents may be noted. It will be observed that the generally longitudinal disposition of the fingers 2 provides good security in holding the base B against rotation on its axis, and preferably also, the fingers have sufficient flexibility to bear against and about the container A in the grasp of the operator.

The base means B includes a portion 3 extending downwardly and inwardly from the portion 1, within the container mouth, to there provide a central socket 4 about which the portion 3 has openings 5 for drainage into the container. The base means B adjacent the portion 1 is provided with internal gear teeth 6, and thereabove is provided with an outstanding inwardly sloping flange 7 in hilt relation with the fingers 2.

The reamer means C includes a spindle 8 seating in the recess 4, a deeply and longitudinally toothed reamer head 9 and therebetween and approximately midway between the ends of the reamer means an annular portion 10 externally toothed for engagement with the teeth 6 of the base means B, with gearing effect, when the reamer means is tilted from its illustrated central position to that indicated by the center line D.

As to operation relation between the reamer and base means, it will be apparent that when the base means B, and thereby the container A is secured as by the left hand of the operator, a fruit half is impaled on the reamer head 9 as by the right hand of the operator, and cranking forces are applied to the reamer by the fruit, the reamer will have tilting or wabbling hypocycloidal motion. The reamer head has rolling and macerating effect within the fruit rather than scraping effect, extracted juices lubricate the two sets of gear teeth and the bearing of the reamer spindle in the base, and drain into the container A by way of the openings 5.

It will also be apparent that interengagement of the gear teeth limits the angularity of the reamer means, and the proportioning and arrangement of the parts is such that downward bearing of the fruit upon the reamer produces sufficient outwardly radial forced component to maintain the teeth effectively interengaged. Thus, in addition to the downward force, the operator need only provide the necessary slight tangential force to produce the cranking translatory progression of the reamer from which its cycloidal progression will automatically result, and awkward radially outward forces as such are not required of the operator.

The proportioning and arrangement of the parts is also such that the downward operating force applied to the reamer head always lies within the periphery of the container, so that stability is had, yet the reamer head closely approaches such periphery so that its translatory or cranking motion is upon as great a radius as possible.

If desired, the device may include as a third principal part, a member E which bears upon the flange 7 and extends outwardly therebeyond to provide additional apron capacity for retention and drainage of extracted material; having prongs 11 extending into the interstices of the teeth of the reamer head and additional strainer openings 12 disposed about the reamer head.

As to the function of the member E, it will be apparent that operation of the reamer will cause its corresponding cycloidal motion on the flange 7.

The general form of the member E is preferably that of a portion of a sphere, as is the upper face of the flange 7, so that such motion of the member E will have minimum displacement effect on retained juices. The disposition of the openings 12 and interstices between the prongs 11 is such that they will not attain the periphery of the flange 7 so that the flange will always receive all drainage therefrom. The interstices between the fingers 11 and the teeth of the reamer head provide a drainage clearance with live effect during operation as is more fully described in my above identified copending application, and, also as there described, removal of the member E clears the reamer head of solid accumulations.

Where the member E is employed, straining is had both at the openings 12 and the interstices between the teeth 11, so that the openings 5 in the base may be large and few, since no straining effect is required of them.

However, since the action of the reamer head upon the fruit avoids scraping as above described, the member E may be omitted from the device if desired. In such event, the openings 5 may be made individually smaller and greatly more numerous so that the straining function is provided by the portion 3 of the base means B within the container mouth. It will be apparent that such omission of the part E lessens the cost of the device.

Also, it is not essential to the cycloidal operation of the reamer, that the disclosed gear teeth be employed. Instead of the cooperative toothed surfaces, such surfaces might be, for example, conical as defined by the pitched circles of the illustrated teeth, so that cycloidal motion would be frictionally instead of positively imparted. Other cycloidal drive means of frictional type, and here employable if desired, is disclosed in my above identified copending application.

What I claim is:

1. In a device of the class described base means adapted to be removably positioned and supported on a receptacle mouth, peripherally thereof, reamer means having a head, a spindle supporting said head and bearing in said base means for tilting and rotational movement about a central point within said receptacle below said head, said base and reamer means having circular portions interengageable to impart cycloidal motion to said head upon cranking forces applied thereto.

2. In a device of the class described base means adapted to be removably positioned and supported on a receptacle mouth, said base means having socket means located to be within said receptacle, and having openings about said socket for drainage into said receptacle, reamer means having a spindle rotatably and tiltably seating in said socket means and a head supported thereby above said base means, said base and reamer means having portions interengageable to impart cycloidal motion to said head upon cranking forces applied thereto.

3. In a device of the class described, base means adapted to be removably positioned and supported on a receptacle mouth, said base means having socket means located to be within said receptacle, reamer means having a spindle rotatably and tiltably seating in said socket means and a head supported thereby above said base means, said base and reamer means having portions interengageable to impart cycloidal motion to said head upon cranking forces applied thereto by one hand of an operator, said base means having holding means located to fit about said mouth and extend therefrom alongside said receptacle sufficiently to be grasped by the other hand of said operator to provide reaction necessary for said cycloidal motion.

4. In a device of the class described, base means adapted to be removably positioned and supported on a receptacle mouth, said base means having socket means located to be within said receptacle, reamer means having a spindle rotatably and tiltably seating in said socket means and a head supported thereby above said base means, said base and reamer means having portions interengageable to impart cycloidal motion to said head upon cranking forces applied thereto, said base means having holding means located to fit about said mouth and extend therefrom alongside said receptacle sufficiently to be grasped by an operator's hand, and said holding means having openings for improved holding effect and providing visibility for said receptacle.

5. In a device of the class described, base means adapted to be removably positioned and supported on a receptacle mouth, said base means having socket means located to be within said receptacle, reamer means having a spindle rotatably and tiltably seating in said socket means and a head supported thereby above said base means, said base and reamer means having portions interengageable to impart cycloidal motion to said head upon cranking forces applied thereto, said base means having holding means located to fit about said mouth and extend therefrom alongside said receptacle, said holding means comprising longitudinally disposed flexible fingers.

6. In a device of the class described, base means adapted to be removably positioned and supported on a receptacle mouth, said base means having socket means located to be within said receptacle, reamer means having a spindle rotatably and tiltably seating in said socket means and a head supported thereby above said base means, said base and reamer means having portions interengageable to impart cycloidal motion to said head upon cranking forces applied thereto, said base means having holding means located to fit about said receptacle, and said holding means comprising longitudinally disposed fingers having flexibility in the direction of said receptacle to bear thereagainst.

7. In a device of the class described, base means adapted to be removably positioned and supported on a receptacle mouth, said base means having socket means located to be within said receptacle, reamer means having a spindle rotatably and tiltably seating in said socket means and a head supported thereby above said base means, said base and reamer means having portions interengageable to impart cycloidal motion to said head upon cranking forces applied thereto, said base means having holding means located to fit about said receptacle, and a peripheral flange disposed to overhang said holding means.

8. In a device of the class described, base means adapted to be removably positioned and supported on a receptacle mouth, said base means having socket means located to be within said receptacle, reamer means having a spindle rotatably and tiltably seating in said socket means and a toothed head supported by said spindle above said base means, said base and reamer means having portions interengageable to impart cycloidal motion to said head upon cranking forces applied thereto, said base means having holding means located to fit about said receptacle, and having a peripheral flange disposed to overhang said holding means, and apron means supported on said flange and having teeth extending between the teeth of said reamer means head.

9. In a device of the class described, base means adapted to be removably positioned and supported on a receptacle mouth, said base means having socket means located to be within said receptacle, reamer means having a spindle rotatably and tiltably seating in said socket means and a toothed head supported by said spindle above said base means, said base and reamer means having portions interengageable to impart cycloidal motion to said head upon cranking forces applied thereto, said base means having holding means located to fit about said receptacle and a peripheral flange disposed to overhang said holding means, and apron means supported on said flange and having teeth extending between the teeth of said reamer means head, the cooperative bearing surfaces of said flange and apron means being spherical about a center above said reamer means.

10. In a device of the class described, base means adapted to be removably positioned and supported on a receptacle mouth, said base means having socket means located to be within said receptacle, reamer means having a spindle rotatably and tiltably seating in said socket means and a toothed head supported by said spindle above said base means, said base and reamer means having portions interengageable to impart cycloidal motion to said head upon cranking forces applied thereto, said base means having holding means located to fit about said receptacle and a peripheral flange disposed to overhang said holding means, and apron means supported on said flange and having teeth extending between the teeth of said reamer means, said apron means having straining openings above said flange.

11. In a device of the class described, reamer means having concentric head and stem portions, base means adapted to be removably positioned and supported on the mouth of a receptacle, and having a portion arranged to receive and position the stem portion of said reamer means for reamer means support while permitting tilting cranking operation of said reamer means about a point within said receptacle adjacent said mouth thereof, said reamer and base means having portions interengageable for providing cycloidal drive for said reamer means responsive to said cranking operation and for limiting the tilting angularity of said reamer means upon said base, the parts being proportioned and arranged to so locate said point that said angularity may be substantial while said reamer means is confined to locations above said mouth.

12. In a device of the class described, reamer means having concentric head and stem portions, base means adapted to be removably positioned and supported on the mouth of a receptacle, and having a portion arranged to receive and position the stem portion of said reamer means for reamer means support while permitting tilting cranking operation of said reamer means about a point within said receptacle, said reamer and base means having portions interengageable for providing cycloidal drive for said reamer means responsive to said cranking operation and for limiting the tilting angularity of said reamer means upon said base, the parts being so proportioned and arranged that said angularity may be substantial while said reamer means is disposed above said mouth, and for the purpose said interengageable portions being located approximately midway the length of said reamer means.

13. In a device of the class described, reamer means having concentric head and stem portions, base means adapted to be removably positioned and supported upon a receptacle mouth, and having a portion arranged to receive and position the reamer means stem portion and permit tilting cranking operation of said reamer means, said reamer and base means having portions interengageable for determining the tilting angularity of said reamer means upon said base means and providing cycloidal drive for said reamer responsive to said cranking operation, the parts being so proportioned and arranged that said angularity will provide said drive without application by the operator of radially directed force to said reamer.

FRANK R. HIGLEY.

REFERENCES CITED

The following references are of record in the file of this patent:

UNITED STATES PATENTS

| Number | Name | Date |
| --- | --- | --- |
| D. 89,232 | Young | Feb. 27, 1933 |
| 325,099 | Manny | Aug. 25, 1885 |
| 422,356 | Smith | Feb. 25, 1890 |
| 951,241 | Hampel | Mar. 8, 1910 |
| 1,747,641 | Morris | Feb. 18, 1930 |

FOREIGN PATENTS

| Number | Country | Date |
| --- | --- | --- |
| 440,595 | Germany | Feb. 7, 1927 |